June 4, 1957  J. A. LOUIS ET AL  2,794,268
APPARATUS FOR TREATING SOLID PRODUCTS IN BULK
Filed July 8, 1954  3 Sheets-Sheet 1

INVENTORS
JEAN A. LOUIS
MAURICE KLING

BY *Adams + Bush*
ATTORNEYS

INVENTORS
**JEAN A. LOUIS
MAURICE KLING**

BY

ATTORNEYS

United States Patent Office 2,794,268
Patented June 4, 1957

2,794,268

APPARATUS FOR TREATING SOLID PRODUCTS IN BULK

Jean André Louis, Lyon, and Maurice Kling, Fontainebleau, France, assignors to Société Preparation Industrielle des Combustibles, Fontainebleau, France Application July 8, 1954, Serial No. 442,074

Claims priority, application France July 8, 1953

1 Claim. (Cl. 34—164)

This invention relates to apparatus for treating solid products in bulk and has more particular reference to such apparatus wherein the solid products are submitted to the action of a gaseous fluid.

One object of the present invention is to provide novel and improved apparatus for treating solid products in bulk, as characterized above, wherein the products to be treated travel by gravity through one or more treating chambers containing a plurality of trickling elements so arranged that the products will be caused to trickle across the elements as they travel through the chamber, either with or against the flow of the gaseous fluid therethrough, and wherein means are provided to give the chamber an oscillatory motion in a direction to cause the products to slide across each trickling element, thereby controlling the speed of the products across the elements and the time required for passage through the treating chamber.

Another object of the present invention is to provide novel and improved apparatus for treating solid products in bulk, as characterized above, wherein means are provided for regulating the amplitude and speed of the oscillations produced by the oscillatory means.

Another object of the present invention is to provide novel and improved apparatus for treating solid products in bulk, as characterized above, wherein a plurality of treating chambers are mounted within a single tower or casing divided into two sections with one or more treating chambers mounted in each section, and wherein means are provided for directing the flow of the treating fluid in one direction through one of the sections and in the opposite direction through the other section.

A further object of the present invention is to provide novel and improved apparatus for treating solid products in bulk, as characterized above, which is simple and rugged in construction, efficient in operation, and extremely flexible in its adaptation.

Other objects and advantages of the invention will appear in the following specification when considered in connection with the accompanying drawings, wherein.

The present invention provides novel and improved apparatus for treating solid products in bulk by submitting the products to the treating action of a gaseous fluid. In general, the apparatus comprises one or more treating chambers through which the products to be treated travel by gravity, each chamber containing a plurality of vertically spaced horizontally extending rows of laterally spaced inclined trickling elements, with all of the trickling elements in each row inclined in the same direction and with that direction being opposite to the direction of inclination of the trickling elements in the rows immediately thereabove and therebelow, whereby the products being treated will be caused to trickle through the chambers either with or against the flow of the gaseous fluid therethrough; and means for oscillating each of the treating chambers in a direction to cause the products being treated to slide across the trickling elements therein, whereby the time required for the products to flow across the trickling elements will be controlled as well as the time the products are in contact with the gaseous fluid.

Figure 1:
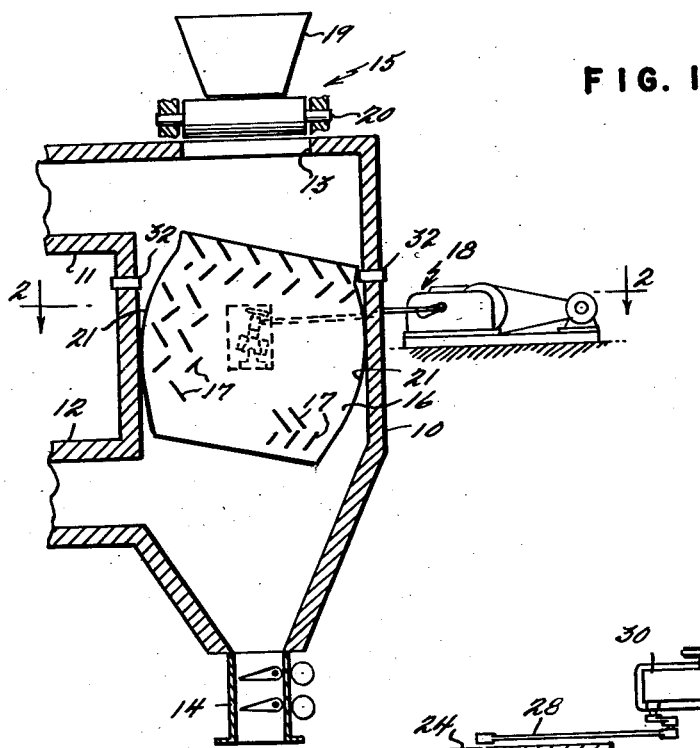
Fig. 1 is a vertical sectional view showing one embodiment of apparatus constructed in accordance with the present invention.

Referring now to the drawings, there is illustrated, in Fig. 1, one embodiment of apparatus constructed in accordance with the present invention. As there shown, the apparatus comprises an upright tower or casing 10 having inlet-outlet gas conduits 11, 12 connected to its top and bottom portions, respectively, for the passage of gaseous fluid, an inlet opening 13 at its top and a valved outlet conduit 14 at its bottom for the passage of the products to be treated; feeding means, indicated generally at 15, for feeding the products to be treated into the top of the tower; a hollow open-ended casing or treating chamber 16 mounted within the tower 10 and carrying a plurality of inclined trickling elements 17; and oscillatory means, indicated generally at 18, for oscillating the casing 16.

The tower 10 may be of any suitable size and shape. In the particular embodiment of the invention illustrated, it is shown as being generally rectangular in cross section with the walls of the lower portion inclined downwardly and inwardly to the valved outlet conduit 14. The tower is provided with an inlet-outlet conduit 11 connected to its upper end portion and an inlet-outlet conduit 12 connected to its lower end portion to permit the flow of the treating gaseous fluid through the tower in either direction.

The feeding means 15 provided for feeding the solid products to be treated into the tower 10, may be of any suitable type. As shown, such means comprises a bunker 19 mounted on top of the tower in communication with the inlet opening 13 therein, and with the admission of the solid products regulated by a feeder 20.

The treating chamber or casing 16 may be of any suitable size and shape. It is shown as an upright hollow open-ended member, generally rectangular in cross section, but with its opposite end walls bulged out along its median center line, as indicated at 21, to prevent the gaseous fluid from passing between the chamber and the tower.

The inclined trickling elements 17 are generally similar in construction and each is shown in the form of an elongated flat member extending transversely of the casing 16, with its ends fixedly attached to the side walls of the casing.

As shown in Fig. 1, the trickling elements 17 are arranged in a plurality of vertically spaced horizontally extending rows, with all of the elements in each row inclined in the same direction, with that direction being opposite to the direction of inclination of the members in the rows immediately thereabove and therebelow. As viewed in Fig. 1, all of the elements 17 in the top horizontal row are inclined downwardly and to the right, all of the members in the second row are inclined downwardly and to the left, and all of the members in each of the succeeding rows are inclined downwardly alternately to the right and left. The members in each row are positioned to receive the products from the members in the row immediately thereabove and discharge them onto the members in the row immediately therebelow in a trickling flow.

Figure 4:
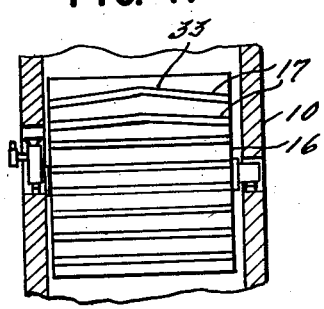
Fig. 4 is a fragmentary elevational view, partly in section, showing modified trickling elements in the first or uppermost row of such elements.

In the event the feeding of the products to be treated should not cover the whole surface of the treating chamber 16, the spreading of the products may be effected by giving the trickling elements 17 in the uppermost row a predetermined inclination in the longitudinal direction of the elements, as shown at 33 in Fig. 4.

The chamber 16 is mounted within the tower 10, as by means of trunnion-like members 22 fixedly attached to and extending outwardly from opposite side walls of the casing and journaled or supported on knife-edges 23 mounted in openings 24 formed in opposite side walls of the tower 10.

While the treating chamber 16 may be oscillated by any suitable means, the particular oscillatory means employed, and indicated generally at 18, are shown as comprising an upstanding bonnet-like lever or member 25 fixedly attached to one of the trunnion members 22 and carrying a threaded rod 26 having its lower end journaled in the trunnion member and its upper end journaled in the upper end of the bonnet member with its projecting upper end fitted with a hand wheel 27 for turning the rod; a connecting rod 28 pivotally connected at one end to a head member 29 mounted on the threaded rod 26 for up and down movement thereon as the rod is rotated, and at its other end to a reduction gearing 30 driven by a motor 31. The construction and arrangement of the oscillatory means is such that the amplitude of the oscillations may be varied by turning the hand wheel 27 to cause the head member 29 to travel up or down on the threaded rod 26, while the speed or frequency of the oscillations may be controlled by controlling the speed of the motor 31.

In case of sticky products, fixed stops or buffer members 32 may be provided on opposite side walls of the tower 10 in position to be alternately struck by the casing at the extreme ends of its oscillations to jar the sticky products loose from the trickling elements.

The operation of the apparatus will be described as employed as a drier to dry comminuted solid products such as coal and ore, or the like.

The products to be treated fall by gravity from the inlet opening 13 in the top of the tower 10 into the casing 16 and then trickle downwardly through the rows of alternately opposed inclined trickling elements therein to the bottom of the tower where the products are evacuated through the outlet opening 14 therein.

Hot gas from a suitable source enters the tower 10 through the inlet-outlet opening 12 in the bottom portion thereof and passes upwardly through the casing 16 and out of the tower through the opening 11 in the top thereof, or the hot gas may flow in the reverse direction. As the hot gas passes through the treating chamber 16 it transmits its heat to the products, directly on the one hand and by contact through the intermediary of the trickling elements on the other. A very effective heat exchange between the hot gas and the products to be treated is thus obtained.

Figure 5:
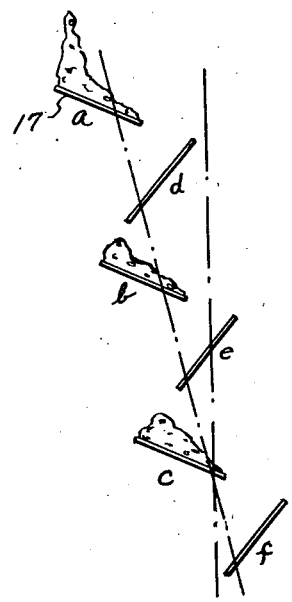
Figs. 5, 6 and 7 are schematic views illustrating the principle of operation of the apparatus shown in Fig. 1.
Figure 6:
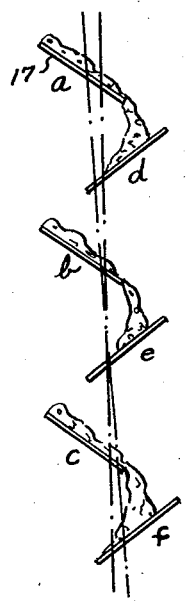
Figure 7:
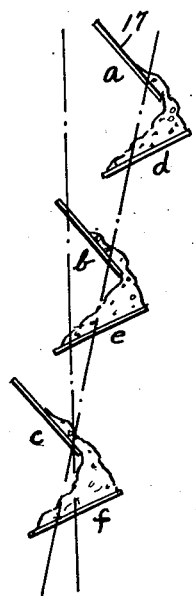

The manner in which the products trickle downwardly through the succeeding rows of inclined trickling members is schematically illustrated in Figs. 5, 6 and 7.

In Fig. 5, the blades a, b and c have such a slope that the products pile on them according to their normal angle of repose while the blades d, e and f have an incline insuring the free flow of the products.

In Fig. 7, the opposite position is shown, in which the blades a, b and c are steeply inclined, insuring the flow of the products, while the inclined blades d, e and f retain the products.

Fig. 6 shows the intermediate position between the positions of Figs. 5 and 7, during which the products fall from the blades a, b and c onto the blades e, f and g.

Thus, one sees that by passing successively from the positions shown in Fig. 5 over that in Fig. 6, to those shown in Fig. 7, the products on the blades a, b and c will be discharged upon the blades e, f and g, and that by returning from the positions shown in Fig. 7 to that shown in Fig. 5, over that in Fig. 6, the products piled upon the blades e, f and g will be discharged upon the blades a, b and c placed immediately below.

In the event the feeding of the products to be treated should not be spread evenly over the whole upper surface of the uppermost row of trickling elements, the elements in this row may be given a predetermined inclination in a direction substantially corresponding to the direction of their longitudinal axis, as indicated at 33 in Fig. 4.

Figure 8:
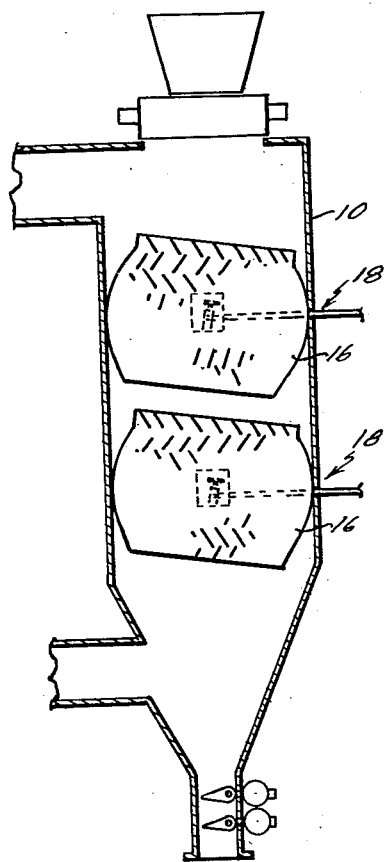
Fig. 8 is a diagrammatic vertical sectional view of a modified form of apparatus.

In Fig. 8 there is shown a modified form of apparatus wherein two treating chambers 16 are mounted within the tower 10, one above the other.

Figure 2:
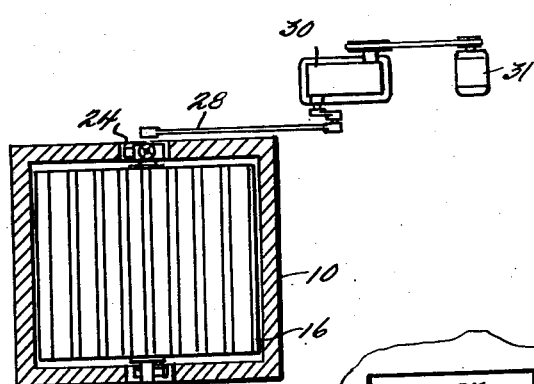
Fig. 2 is a view taken on the line 2—2 of Fig. 1.
Figure 3:
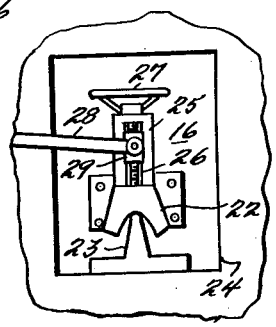
Fig. 3 is a fragmentary elevational view showing the manner in which the treating chamber is mounted within the tower.

In this particular modification, the treating chambers 16, the manner in which they are mounted within the tower 10 and the oscillatory means 18 for giving each chamber an oscillatory motion are identical to these corresponding features as illustrated in Figs. 1, 2 and 3.

The operation of this modification is generally similar to the operation of the modification shown in Fig. 1, except that products being treated are made to travel through a plurality of treating chambers.

Figure 9:
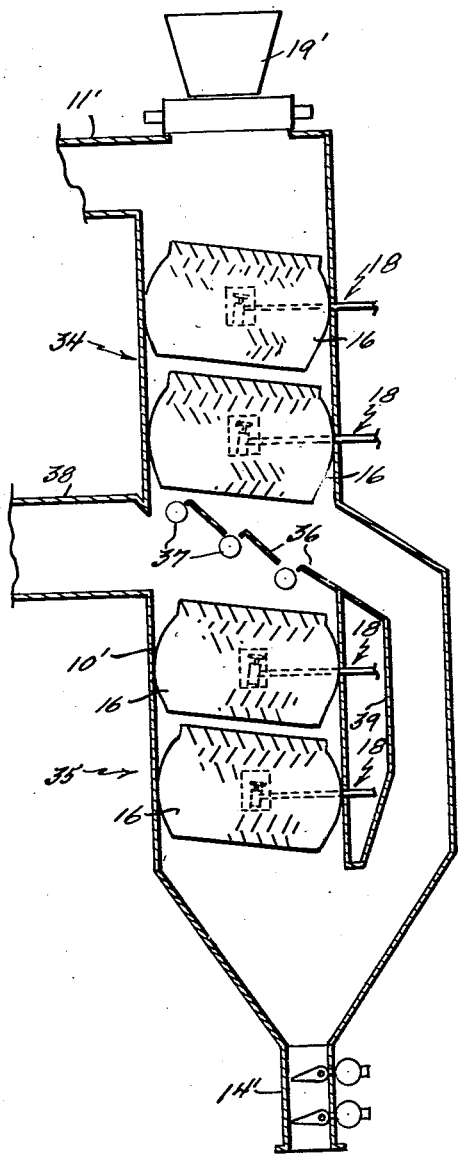
Fig. 9 is a diagrammatic vertical sectional view of still another modified form of apparatus.

In Fig. 9 there is shown still another modified form of apparatus wherein four treating chambers 16 are mounted within the tower 10′, two in the upper portion of the tower and two in the lower portion, with a partition wall separating the two portions of the tower, and with means for directing the flow of the treating gaseous fluid in one direction through the lower portion of the tower and in the opposite direction through the upper portion of the tower.

In this particular modification, the tower 10′ is generally similar to the tower shown in Fig. 1, and is shown as being separated into an upper portion, indicated generally at 34, and a lower portion, indicated generally at 35, by a downwardly inclined gas-tight partition wall 36 provided with a plurality of rotary valves 37 which permit the passage of the solid products from the upper part of the tower into the lower part thereof. A pair of treating chambers 16 are mounted one above the other in the upper part of the tower and a similar pair of treating chambers 16 are mounted one above the other in the lower part of the tower. An inlet conduit 38 is connected to introduce the treating gaseous fluid into the upper end of the lower part of the tower where it travels downward through the pair of treating chambers 16 mounted in the lower part. A conduit 39 connects the bottom portion of the tower to the intermediate portion of the tower just below the bottom of the two treating chambers 16 which are mounted in the upper part of the tower.

The pair of treating chambers 16 mounted in the upper part of the tower 10′ and the pair of treating chambers 16 mounted in the lower part of the tower are identical in construction to the pair of treating chambers shown in Fig. 2, and each pair is mounted within the tower in a similar manner to the manner in which the pair of treating chambers 16 are mounted in the tower 10, as shown in Fig. 1, and both the upper and lower pairs of treating chambers are oscillated by oscillating means 18 which are identical in constructions to the oscillating means 18 shown in Fig. 1.

The operation of this modification of the apparatus is apparent. The treating gaseous fluid enters the tower through inlet conduit 38, passes downwardly through the pair of treating chambers 16 in the lower part of the tower, then upwardly through the conduit 39 and back into the tower below the upper pair of treating chambers 16 mounted within the upper portion of the tower, then through these treating chambers and out of the tower through outlet conduit 11'.

The solid products being treated are fed into the top of the tower from the hopper 19' and fall into the uppermost one of the pair of treating chambers in the upper part of the tower, then, they trickle downward through the pair of treating chambers 16 and pass through the rotary valves 37 in the partition wall 36 into the uppermost of the pair of treating chambers 16 in the lower part of the tower. The products trickle downwardly through these treating chambers and fall into the bottom of the tower, from which they are evacuated through valved outlet conduit 14'.

This modified form of apparatus is especially effective in treating solid products by heated gases which products would burn or deteriorate if they were in contact with too hot gases, particularly when the solid products are ignitable.

The apparatus of the present invention, in all of its various modifications as illustrated, is particularly adapted for drying solid products in bulk by subjecting them to a flow of hot gases through the apparatus, either in the same direction as the flow of products being treated therethrough, or counter-current thereto. As the hot gas passes longitudinally through the tower and through the treating chambers therein it transmits its heat to the products directly on the one hand and by contact through the intermediary of the trickling elements on the other, thus providing a very effective heat exchange between the hot gas and the products being treated.

From the foregoing, it readily will be apparent that there has been provided novel and improved apparatus for treating solid products in bulk by submitting them to the treating action of a gaseous fluid, which is simple and rugged in construction, in which the products to be treated travel by gravity through one or more treating chambers containing a plurality of inclined trickling elements so constructed and arranged that the products being treated will be caused to trickle across the trickling elements as the products travel by gravity through the treating chambers, and in which controlled oscillatory means are provided to oscillate the chambers and the trickling elements therein in a direction substantially corresponding to the direction of the advance of the products thereacross whereby the speed of travel of the products across the trickling elements may be controlled by controlling the amplitude and the speed of the oscillatory means.

Obviously, the invention is not restricted to the particular modifications thereof herein shown and described, but is capable of various changes within the scope of the appended claim.

What is claimed is:

Apparatus for treating solid products in bulk by means of a gaseous fluid, comprising an elongated vertical casing; means for feeding the products to be treated into the top of the casing so that they will travel through the casing by gravity; means for evacuating the treated products from the bottom of the casing; means for passing a treating gaseous fluid longitudinally through the casing; an upright open-ended treating chamber mounted within said casing for oscillatory swinging movement therein about a pivotal axis; a plurality of trickling elements having inclined upper surfaces mounted within and extending across said chamber in a direction parallel with said pivotal axis and with their ends fixedly attached to the side walls of said chamber; said trickling elements being so positioned and arranged that the products being treated will be caused to trickle across the upper inclined surfaces thereof as they travel through the chamber; and oscillatory means connected to oscillate said chamber about its pivotal axis and thereby periodically modify the slopes of the upper inclined surfaces of the trickling elements therein in a direction substantially corresponding to the direction of the advance of the products thereacross whereby the speed of travel of the products across the trickling elements may be controlled.

References Cited in the file of this patent

UNITED STATES PATENTS

| | | |
|---|---|---|
| 579,398 | Klippert | Mar. 23, 1897 |
| 618,508 | Hess | Jan. 31, 1899 |
| 1,068,162 | Payne | July 22, 1913 |
| 2,610,412 | Rasmussen | Sept. 16, 1952 |

FOREIGN PATENTS

| | | |
|---|---|---|
| 159,733 | Switzerland | Apr. 1, 1933 |
| 663,410 | Germany | Aug. 5, 1938 |